United States Patent Office 3,514,312
Patented May 26, 1970

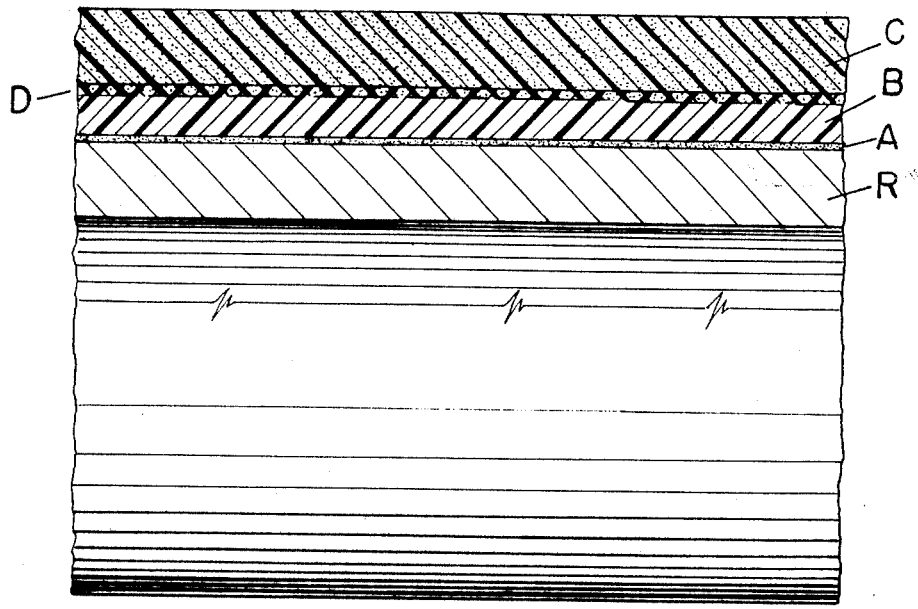

3,514,312
PROCESS FOR COATING A METAL SURFACE
Peter Gardiner, Mineral Wells, Tex., assignor to The Barrier Corporation, Mineral Wells, Tex., a corporation of Texas
Continuation-in-part of application Ser. No. 515,514, Dec. 3, 1965. This application July 12, 1967, Ser. No. 659,268
Int. Cl. B44d 1/09, 1/14, 1/34
U.S. Cl. 117—49                                   4 Claims

ABSTRACT OF THE DISCLOSURE

A process for making a plastic roller wherein a metallic cylindrical core is covered with a layer of hard plastisol material adjacent to the core and with a layer of relatively soft plastisol material on the outer surface. The process comprises applying an adhesive to the metal, heating the metal, applying a first layer of plastisol to allow the heated metal to gel a first layer of plastisol of minimum thickness of about 1/16 inch immediately adjacent to the adhesive surface, applying a second plastisol layer, and heating to cure the layers. As a modification, the heating of the metal may be omitted, whereby a highly thixotropic first layer of plastisol is applied to form a film of minimum thickness of 1/16 inch, a second relatively soft plastisol layer is applied, and the layers are cured by heating, which may be performed in a mold.

---

This application is a continuation-in-part of my previous application for patent Ser. No. 515,514, filed Dec. 3, 1965 now abandoned, entitled "Plastic Roller Covering."

This invention relates to the formation of a bond between a very soft vinyl chloride plastisol (over 100 phr. of plasticizer) to a metal substrate (example: a printing press roll) which requires a very soft working surface (12–50 Shore A durometer).

The resultant product formed by my new process is a metal substrate surface with an adhesive bonded to it, a layer of relatively hard plastic bonded to the adhesive, and a layer of softer plastic fused to and commingled with the intermediate layer of harder plastic.

The presently available primers for vinyl chloride plastisol function only at lower plasticizer levels (e.g. where in general the level is the same as, or less than, the resin content on a weight percentage basis in the plastisol). When the plasticizer level was raised appreciably (well over 1:1 with resin) it was found that satisfactory adhesion to a metal or other material substrate was not attained.

Some of the plastisols used had dry surfaces, some relatively tacky or oily surfaces, but in each case the adhesion was unsatisfactory.

One factor involved preventing adhesion with the higher plasticizer level was the excessive shrinkage involved.

A normal plastisol shrinks approximately 1% upon returning to atmospheric temperature from fusion temperature (350° F. to 400° F.) while the higher plasticizer level materials shrink 2–5% or more.

This excessive shrinkage would cause an otherwise satisfactory adhesive to fail, especially during the fusion cycle, when the adhesive is very soft and under attack from the solvent action of the overlying plasticizer. It was also found that during the fusion cycle, the plastisol, whether normally wet or dry surfaced, at atmospheric temperature, would have a tendency to become quite wet on the surface immediately after fusion and while still hot.

One attempt to solve this problem of lack of adhesion was to affix steel wool to the metal substrate by spot welding, and then permeate the steel wool with the higher plasticizer level plastisol, and also deposit a layer of softer higher plasticizer level plastisol on the outside which is used in forming printing press rolls. The steel wool compensated for the lack of bond to the metal substrate.

The attached drawing illustrates my process diagrammatically for applying the combination hard and soft plasticizer to the surface of a metal substrate; such as a metal roller.

My solution to this problem is outlined in the following steps:

STEP 1

The metal surface of a roller R is first prepared in the normaly manner of machining, sandblasting, acid or alkaline liquid cleaning, or by other recognized methods, to obtain a clean, rust and oil free, slightly roughened surface.

STEP 2

A coating of known adhesive, or primar (material A), normally used for standard vinyl chloride plastisol coating (under 100 phr. of plasticizer) is then applied to the metal surface. This coating is in liquid form, and may be applied by spraying, dipping or brushing thereon. Such coating is relatively thin such as would be deposited by a single dip of the surface into the liquid. It must, however, completely coat the surface. A suitable adhesive for this purpose is that disclosed in U.S. Pat. No. 2,891,876, dated June 23, 1959 to Kenneth L. Brown, entitled "Primers for Vinyl Chloride Resin Coatings," reference to which is hereby made.

STEP 3

The adhesive coated metal is then heated to above the gel temperature of plastisol (250° F. minimum), such heat being sufficient to partially polymerize the adhesive, and,

STEP 4

The adhesive coated metal member is immersed in a cold resin (material B), suspension while the metal is still heated. The coated metal should not be allowed to cool and then reheated before dipping it in the cold resin suspension.

Typical formulation for material B is as follows:

|  | Phr. (parts per 100 parts resin) |
|---|---|
| High molecular weight dispersion resin | 100 |
| Polymeric or monomeric plasticizer | 60 |
| Inert filler (CaCO$_3$) | 30 |
| Epoxidized soya oil | 5–10 |
| Metallic stabilizer | 2–5 |

The above may be modified by adding 2–10 parts of thixotroping agent per 100 parts resin, for purposes hereinafter mentioned.

The dispersion resin used in this part of the system should have an average molecular weight of at least 20,000 and may range over 100,000 without changing its function therein. Normally this is referred to as a vinyl homopolymer, but the resin portion may also contain ratios of a blending resin which may be a copolymer or a lower molecular weight homopolymer. The blending or dispersion resin can be used to reduce viscosity and material cost.

The resin system (material B) is well known in the art and includes thermoplastic homopolymers and copolymers derived from vinyl chloride alone or a combination with vinylidene chloride, vinyl acetate or other ester of vinyl alcohol.

Examples of suitable resins would be the homopolymer Exon 654 made by Firestone Tire & Rubber Company (a high molecular weight polyvinyl chloride polymer resin in powder form), Geon 121 made by B. F. Goodrich Chemical Company (a vinyl chloride polymer), or in conjunction with copolymer blending resin Geon 202 of B. F. Goodrich (a copolymer of vinyl chloride and vinylidene chloride), or homopolymer blending resin Exon 666 of Firestone.

A typical plasticizer would be di-isodecyl phthalate made by B. F. Goodrich Chemical Company and others.

The ratio of plasticizer used in this portion of the process is not critical, although the normal range is from 40–90 phr. with a preference for the lower range as long as a workable plastisol is attained. As shown 60 phr. would be preferable. The function of the ratio is as follows:

(1) By the plasticizer being lower in material B it affords a drier (in the sense of plasticizer exudation) surface, but which will partially dissolve the underlying adhesive primer during the fusion operation, and thus form a better bond.

(2)—A lower ratio of plasticizer to resin gives excess capacity of the resin to absorb plasticizer from the succeeding layer of plastisol (material C), which relatively has much less plasticizer capacity.

The inert filler in the formulation acts to harden the plastisol and give additional capacity for plasticizer absorption. The filler may be omitted. A typical filler suitable for this purpose is #10 White marketed by Georgia Marble Company.

The thixotroping agent in material B increases the apparent viscosity at low rates of flow, and has less effect at high rates of flow or agitation. In effect this permits a material to be handled at relatively low viscosity while applying a high build-up or thickness, but tends to hold the material in place by becoming thick once it is motionless. The viscosity must not drop, which would allow the plastisol to sag and drip off in the relatively higher temperatures of about 375° to 400° F., while the mass is fusing. Typical of material in this category would be Santocel Z made by Monsanto Company, St. Louis, Mo.

The epoxidized soya oil acts to give additional water resistance and light stability to the material. Typical of this material is Admex 672 marketed by Archer-Daniels-Midland Co.

The metallic stabilizer selectively reacts with the hydrochloric acid formed during the fusion operation and prevents degradation of the finished product. A typical metallic stabilizer is BC–103 of Advance Chemical Division of Carlisle Chemical Works, New Brunswick, N. J.

STEP 5

The metal member is withdrawn from the cold resin suspension after suitable build-up attains. The build-up is attained by virtue of the fact that the heated metal member gels the resin in the suspension material immediately adjacent the surface. Preferably a layer of 1/16" minimum thickness is attained.

The coated metal can be reheated for further curing before the exterior very soft plastisol layer (material C) is poured into the mold about the coated member. However, material B should not be completely heat cured at this for the reasons hereinafter made clear.

Typical formulation for material C is as follows:

| | Phr. (parts per 100 parts resin) |
|---|---|
| High molecular weight dispersion resin | 100 |
| Monomeric or polymeric plasticizer mixture (non-migration) | 100–300 |
| Inert filler | 20 |
| Epoxidized soya oil | 5–10 |
| Metallic stabilizer | 2–6 |

The composition of this plastisol is the same as that described above with reference to material B in all respects except for the level of plasticizer. In order to obtain the necessary low Shore A durometer reading, a very high plasticizer level is necessary. The plasticizer or plasticizer combination must be of utmost permanence. The tendency to migrate to migrate to the harder substrate, or have a tacky feeling surface, must be minimized. Typical materials in this classification are Paraplex G–40 (a polyester resinous type plasticizer characterized by permanence, high resistance to extraction, and by their non-volatile and non-migratory properties) of Rohm & Haas Chemical Company, Philadelphia, Pa.

STEP 6

The entire mass is then heated to curing temperature. Material C and material B are already partially cured, and as they are completely curing, and as material C is cured therewith, there is a physical blending of the adjoining surfaces to provide an integral bond, as indicated at D in the drawing.

As a modification of the procedure set forth above the adhesive coated metal in Step 3 may, without heating, be coated with a very thick, viscous plastisol (material B with thixotroping agent added) to a thickness of not less than .060". This material may be applied by wiping or troweling on to give the desired thickness without sagging at room temperature, or after application of heat in the fusion process. It must also not be dissolved by, or commingle with the softer plastisol in the outer layer either during the processing of the roll, or later in service.

Such coated member may then be placed in a mold, and the exterior very soft plastisol (material C) is poured into place, and the entire mass is heated to fusing temperature. None of the materials have had heat applied thereto prior to this time, and all are fused simultaneously.

By the use of this modified method lower production time is required because the metal is not heated prior to application of the intermediate layer, and time is not consumed in build-up by dipping. Furthermore, all parts are maintained at the same temperature until curing heat is applied, thereby permitting uniformity in temperature and time for curing and uniformity of the end product.

Thus there is provided a metal core or surface having a soft plastic covering molded thereon. The surface may be ground, smoothed and leveled, and used in rotative pressure engagement with other surfaces without unduly distorting or separating from the core, and does not have any embedded reinforcements to cause irregular distortion.

Having described my invention I claim:

1. A process for coating a metal surface with a soft elastic plastic material comprising, conditioning the surface to provide a clean roughened surface; applying a coating of adhesive suitable for vinyl chloride plastisol covering; heating the coated metal above the gel temperature of plastisol; placing a first layer of plastisol on the surface of the adhesive coating to allow the heated metal to gel a first layer of plastisol of a minimum thickness of about 1/16 inch immediately adjacent to the surface of the adhesive while the metal is in such heated state; placing a second layer of plastisol over the surface of the first said layer, the second said layer having a higher proportion of plasticizer therein than the first plastisol layer; and heating the layers and adhesive to a temperature sufficient to completely cure same into an integral covering for the metal surface.

2. The process of claim 1 wherein the first layer of plastisol comprises the following formulation:

| | Phr. (parts per 100 parts resin) |
|---|---|
| High molecular weight dispersion resin | 100 |
| Polymeric or monomeric plasticizer | 30–90 |
| Inert filler ($CaCO_3$) | 0–30 |
| Epoxidized soya oil | 5–10 |
| Metallic stabilizer | 2–5 | and the second layer of plastisol comprises the following formulation:

| | Phr. (parts per 100 parts resin) |
|---|---|
| High molecular weight dispersion resin | 100 |
| Polymeric or monomeric plasticizer | 100–300 |
| Inert filler | 0–20 |
| Epoxidized soya oil | 5–10 |
| Metallic stabilizer | 2–6 |

3. The process of claim 1 wherein the vinyl chloride has an average molecular weight of 20,000 to 100,000.

4. A process for coating a metal surface with a soft elastic plastic material comprising, conditioning the surface to provide a clean roughened surface; applying a coating of adhesive suitable for vinyl chloride plastisol covering; applying a highly thixotropic first layer of plastisol on the surface of the adhesive to form a film of such plastisol of a minimum thickness of about 1/16 inch while the metal remains at room temperature; placing a second layer of plastisol over the surface of the first said layer, the second plastisol layer having a higher proportion of plasticizer therein than the first plastisol layer; and heating the plastisol layers and adhesive to a temperature sufficient to completely cure the layers into an integral covering for the metal surface.

References Cited

UNITED STATES PATENTS

| | | | |
|---|---|---|---|
| 2,536,323 | 1/1951 | Spencer | 117—94 |
| 2,631,358 | 3/1953 | Hill | 117—75 |
| 2,872,349 | 2/1959 | Hunn | 117—75 |
| 2,891,876 | 6/1959 | Brown et al. | 117—75 X |
| 2,927,346 | 3/1960 | Hill | 29—132 X |
| 2,979,416 | 4/1961 | Drexler | 117—2 |
| 3,131,081 | 4/1964 | Husum | 117—75 X |
| 3,136,651 | 6/1964 | Spessard | 117—75 X |

FOREIGN PATENTS

| | | |
|---|---|---|
| 869,459 | 5/1961 | Great Britain. |
| 632,530 | 12/1961 | Canada. |

WILLIAM D. MARTIN, Primary Examiner

R. HUSACK, Assistant Examiner

U.S. Cl. X.R.

29—132; 117—64, 75, 94, 132; 264—134